Figure 1:
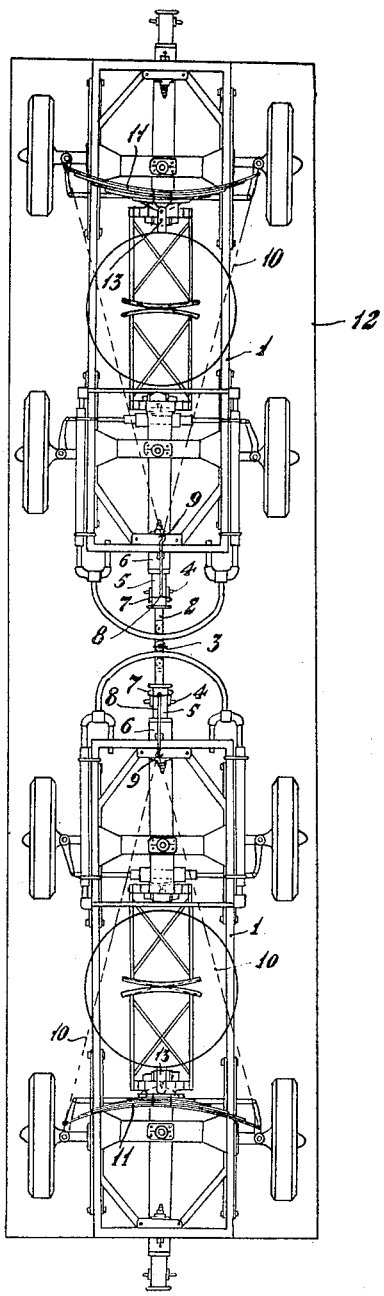

Dec. 9, 1924.

H. W. JONKHOFF 1,518,517

TRAILER STEERING DEVICE

Filed June 19, 1923 2 Sheets-Sheet 1

Inventor
H.W. Jonkhoff
by Langner Parry Card & Langner,
Attys.

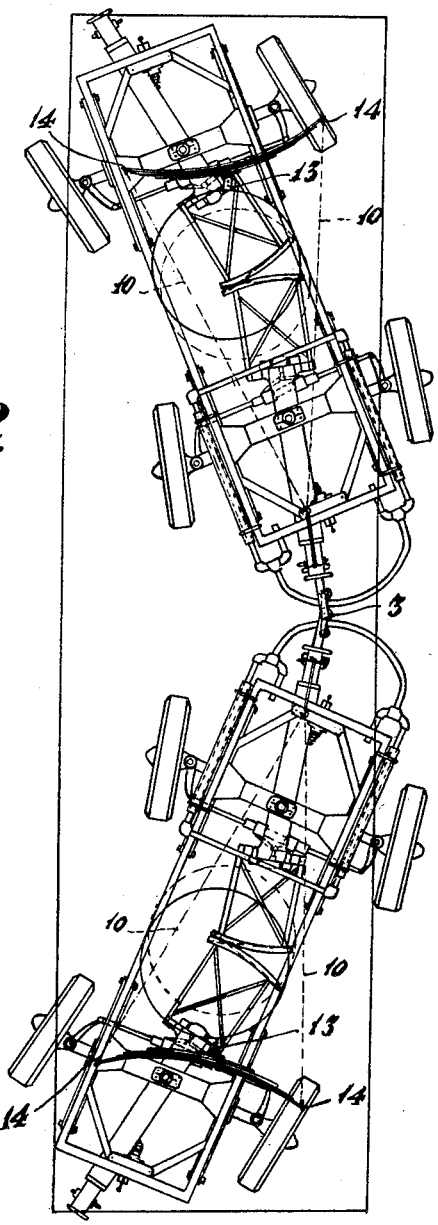

Patented Dec. 9, 1924.

1,518,517

UNITED STATES PATENT OFFICE.

HENRI WOUTER JONKHOFF, OF SEMARANG, JAVA, DUTCH EAST INDIES.

TRAILER STEERING DEVICE.

Application filed June 19, 1923. Serial No. 646,429.

*To all whom it may concern:*

Be it known that I, HENRI WOUTER JONK-HOFF, a subject of the Queen of The Netherlands, residing at Semarang, Java, Dutch East Indies, have invented certain new and useful Improvements in a Trailer Steering Device, of which the following is a specification.

Turntables or fifth-wheels, which with regard to the truck upon which they are secured are slidable in longitudinal direction are already known. Hereby in making curves an alteration was possible of the centre distance of e. g. two coupled fourwheel-trailer trucks carrying a loading surface, common for both trucks, upon one fixed and a slidable turntable.

The invention has for its object to distribute the sliding movement in curves simultaneously over both turntables, so that both tables will have to be provided with such a sliding-device. By reason of the fact namely that a difference in length arises between the loading-surface on the one hand and the whole of the two coupled trucks on the other hand, as soon as there is curving the centre distance of these two coupled four-wheel-trailer-trucks diminishes then in case e. g. the front turntable is rigidly secured to the front trailer truck, the arising difference in curves will have to be totally absorbed by the sliding device of the turntable of the second trailer truck, so that not only the distribution of weight on this truck is unfavourable but the loading surface will also project behind the said truck. This, in particular in tractortrain formations gives rise to difficulties, seeing that coupling rods should not be lengthened, and the principle of equal wheel positions in the train could not be maintained.

The invention has now for its object the distribution of the difference of center distance of the two trucks in curves over two sliding devices of two turntables, whereby the above-mentioned difficulties are met with for 50%. However, as soon as both turntables are slidable in the longitudinal axis of their trailer-truck, then the attachment of the loading surface to the truck, by which the horizontal force of this truck is transmitted to the loading surface, has to be effected in another way. In the former use of one fixed turntable e. g. upon the front trailer truck, this fixed turntable will act as a transmitter of these horizontal forces from truck to loading surface. Now, however, with the aid of the invention this unlogical function can be eliminated. Both turntables can then perform equally the same function, namely receiving exclusively the vertical forces, due to the weight of the loading surface, while horizontal forces, whatever the direction may be, are annulled by the combined turning and sliding device of both turntables.

The attachment without which the horizontal force of the truck cannot be transmitted to the loading surface will be effected according to the invention at the pivotal point in the connecting rod between both trailer trucks, from where the connection leads to each of the extremities of the loading surface to which these connections are resiliently secured. In this manner the loading surface is maintained in position with respect to both trucks by reason of the fact that the above mentioned spring action guarantees an equal distance from the two extremities of the loading surface to the central pivot in the connecting rod between both trailers. The above-mentioned spring action then serves as an automatic distance-keeper between the centre of the turntable at the one hand and the pivot in the connecting rod at the other hand. At the same time the sliding movement of both turntables is equalized by this spring-action.

The two coupled trailers, conceived as a whole, thus permit the loading surface to slide along the arc of a circle which in curves they trace as a biarticulate truck. At the same time the loading surface can slide over this biarticulated truck in longitudinal direction when the longitudinal axes of both trucks are in alignment. Thus when starting the train this spring action will serve at the same time as shock absorber as it retards the moment of movement of the loading surface with respect to the starting moment of the trailer trucks.

In this manner it is thus obtained that resiliently coupled trailers are resiliently connected to a loading surface supported upon these two trailers and which under all circumstances can slide upon this biarticulate truck and this sliding movement is then controlled by a spring action at either sides of the pivot in the connecting rod, while the tension in this spring action is determined by the location of the point of intersection or pivot in the connecting rod secured to these springs.

The invention will be more fully understood with reference to the accompanying drawings in which Fig. 1 is a plan view of two resiliently coupled fourwheel-trailer-trucks, the longitudinal axes of which are in alignment. Fig. 2 is a plan view of this coupled trucks in a curve.

In Fig. 1 two trailer trucks 1 and 1 are shown, which are coupled together by the connecting rod 2 which in the middle possesses a pivot 3 and which by means of pins 4 at either side is non-resiliently secured to the spring buffers 5 of both trailer trucks. Therefore in case from two sides a connection is wanted to the point of intersection 3 then these may be effected equally well at other points in the given distance 5, 5 proportionally distanced from point 3, as the distance between these corresponding points and the point of intersection 3 under all circumstances will remain the same. The spring buffers 5 namely slide in their sleeves 6 between which sleeves the point 3 is adapted to move by reason of the spring action of the buffers.

In the drawing these corresponding points of attachment are e. g. chosen in the resilient portions of the buffers at the points 7 where a link pivotally engages the buffer 5. This link is further engaged by a hook 8, which can slide above the trailer truck 1 and to which at 9 a double cable or other connection 10 is secured which is connected to the ends of a spring 11 which on its turn is attached to the loading surface 12 at point 13 where this spring has a pivot point which will come into operation when making curves.

Figure 2.—Herein this is illustrated by an example.

The longitudinal axes of both trailer trucks are no more in alinement. The point of intersection 3 in the connecting rod shows therefore a lateral deflection outside the longitudinal axis of the loading surface 12, so that the distances between the point of intersection 3 and the spring pivots 13 are increased whereby in both these springs, in the given position, a tension will arise, which is effected from point 3 equally to both sides.

As a matter of fact in these springs some tension must always be present even when the distance M—B is smallest as in Figure 1 for the reason that this tension must be adapted, even when the train has stopped, to stabilize the loading surface that is to say to keep it as much as possible centrally above the point of intersection 3 in the connecting rod, and this tension may be increased at will by shortening the connection by means of set screws at the points 14, whereby the swinging capacity of the springs will diminish.

I claim:

1. A trailer steering device, comprising, two vehicles, a connecting rod coupling the vehicles, a turn table on each vehicle, a loading platform slidably supported by the turn tables, and a resilient connection between the connecting rod and the loading platform.

2. A trailer steering device, comprising, a vehicle truck, a loading platform, a slidable connection between the truck and the platform, and a resilient connection between the truck and the platform, whereby traction is set up between the truck and platform upon a change in distance between the end of the platform, and a point in the longitudinal axis of the truck.

In testimony whereof I affix my signature.

HENRI WOUTER JONKHOFF.